July 24, 1928.
E. E. MEISEKOTHEN
1,678,601
DRY BATTERY AND METHOD OF MANUFACTURE
Filed Jan. 25, 1926    2 Sheets-Sheet 1
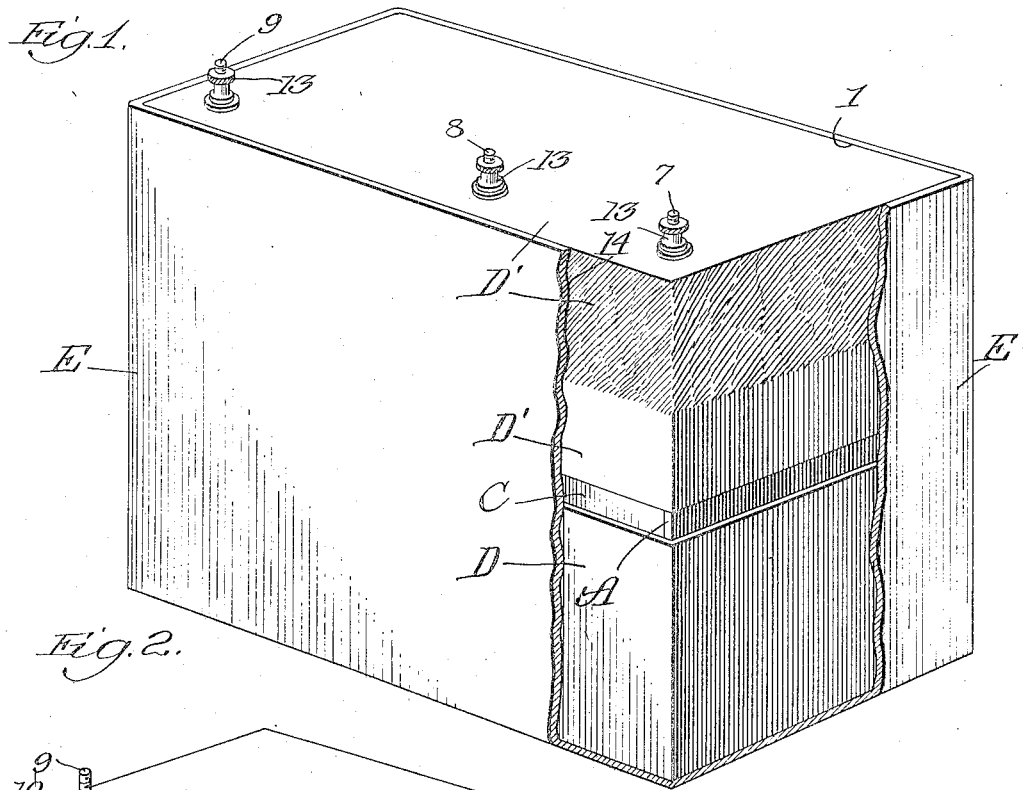
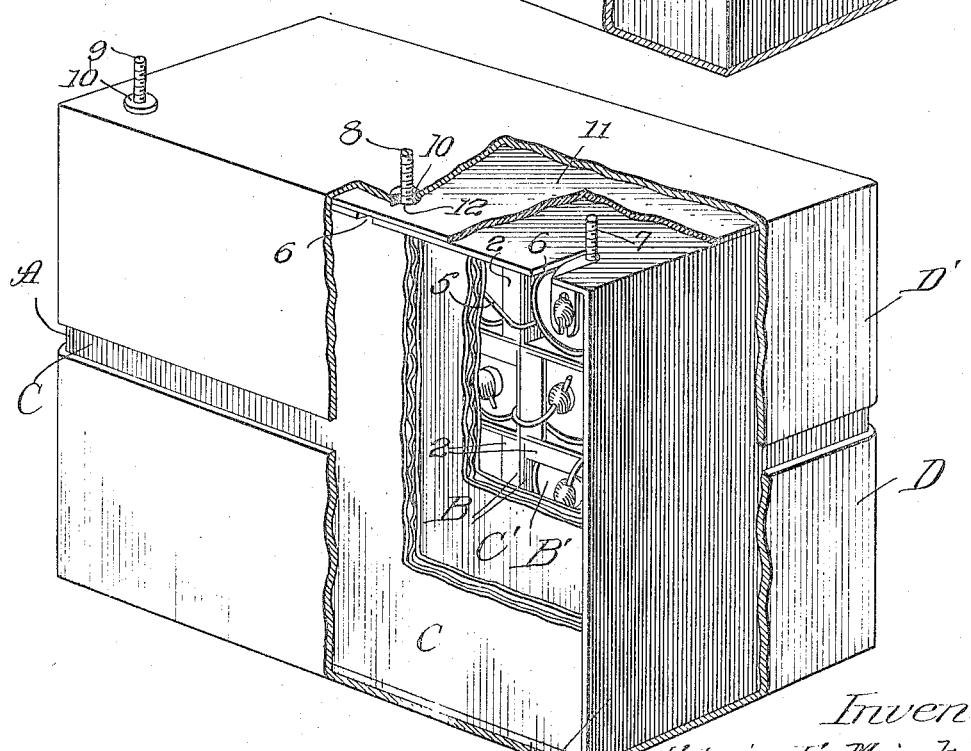
Inventor:
Edwin E. Meisekothen, July 24, 1928.  1,678,601
E. E. MEISEKOTHEN
DRY BATTERY AND METHOD OF MANUFACTURE
Filed Jan. 25, 1926    2 Sheets-Sheet 2
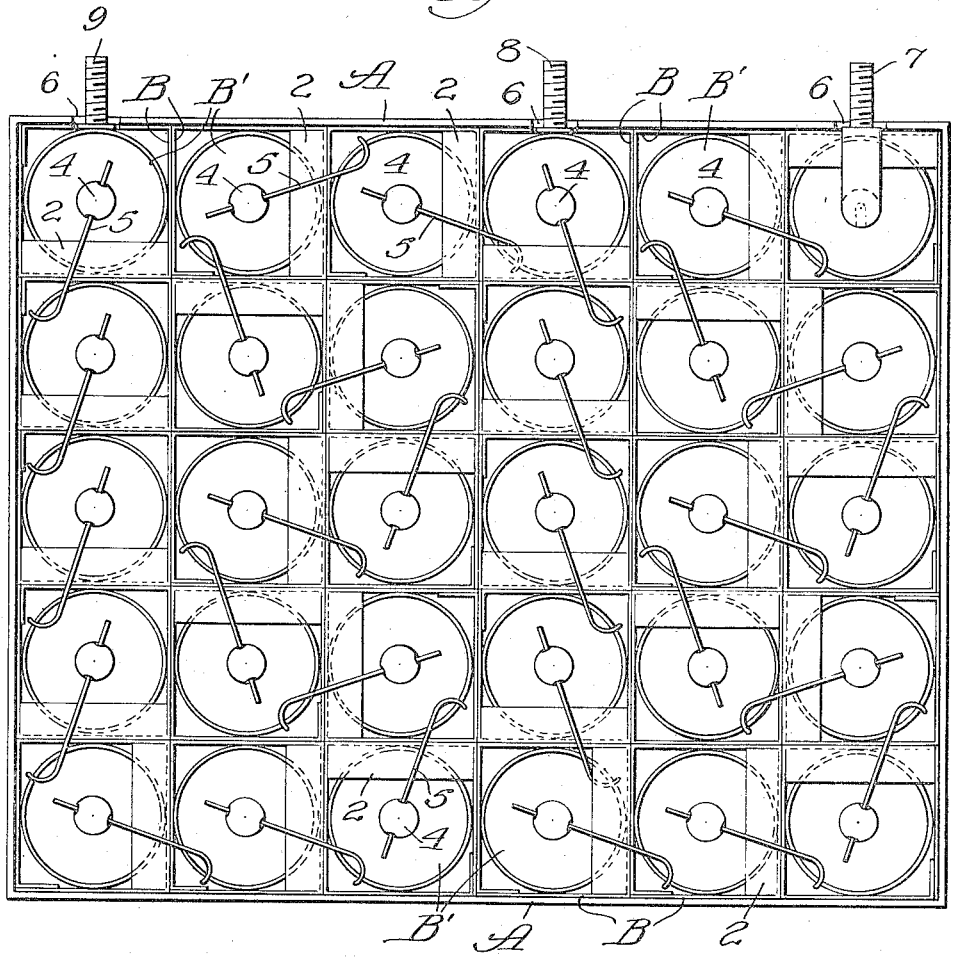
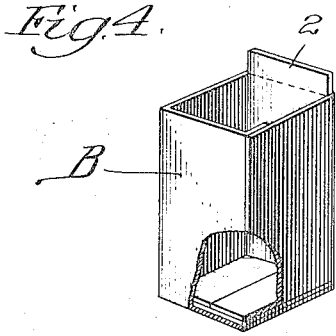

Patented July 24, 1928.

1,678,601

UNITED STATES PATENT OFFICE.

EDWIN E. MEISEKOTHEN, OF MADISON, WISCONSIN, ASSIGNOR TO FRENCH BATTERY COMPANY, OF MADISON, WISCONSIN, A CORPORATION OF WISCONSIN.

DRY BATTERY AND METHOD OF MANUFACTURE.

Application filed January 25, 1926. Serial No. 83,578.

This invention relates particularly to dry batteries of the general type now commonly employed for radio purposes.

The primary object is to provide a lighter and cheaper battery for the purpose than has heretofore been available, and an improved method of manufacturing such battery. The invention contemplates a battery in which sealing compounds are dispensed with, except in the individual cells; and it is an object of the invention to provide a practicable and readily assembled dry-battery of this type which is light, strong, and durable, which omits the use of sealing compounds in connection with the assemblage of the cells, and which can be assembled expeditiously and at moderate cost.

The invention is illustrated in its preferred embodiment in the accompanying drawings, in which—

Fig. 1 represents a broken perspective view of a battery constructed in accordance with the invention, a portion of the outer casing being broken away; Fig. 2, a broken perspective view with the outer casing wholly removed; Fig. 3, a plan view showing the manner in which the cells are assembled in an inner pasteboard box before applying the accessories shown in Fig. 2; and Fig. 4, a broken perspective view of an individual cell carton employed in effecting the assembly shown in Fig. 3.

In the embodiment illustrated, A designates an inner pasteboard box used in making the initial assemblage; B, individual cell cartons arranged in longitudinal and transverse rows within the box A; B', dry-cells within the cartons B; C, C', corrugated paper, or pasteboard filler-plates placed over the cells and within the upper margin of the box A after the cells have been assembled in said box; D, D', lids, or shallow boxes, which are slipped over the lateral sides of the box A; and E, an outer pasteboard casing which is open at its upper narrow side, as indicated at 1, the assemblage shown in Fig. 2 being slipped into the casing E through the narrow open side.

The individual cell cartons B may be constructed from suitable material, such as thin cardboard, or stiff paper, which may be impregnated with paraffin. Fig. 4 illustrates a carton suitable for the purpose. Such a carton may be formed by folding a suitable blank into the form of a rectangular box and leaving one end open. In the illustration given, the carton is provided at its open end with a flap, or tab, 2. These flaps are adapted to be bent over the tops of the cells to prevent the wire connections from short-circuiting them.

The dry-cells B' may be of the type ordinarily employed for flashlight purposes. Such cells are provided ordinarily with zinc cups 3 and carbon poles 4. The cells may be connected as desired. In the illustration given, they are shown connected in series by means of wires 5.

The preferred manner of effecting the assembly in Fig. 3 is to introduce the individual cartons into the box A and then insert the cells into the cartons with the carbon poles up. One lateral side of the box A is shown provided at its upper edge with slots 6 adapted to accommodate the laterally projecting terminals 7, 8 and 9. The positive terminal 7 is connected with the carbon pole of the cell at one end of the series, and the negative terminal 9 is connected with the zinc cup of the cell at the opposite end of the series. The terminal 8 is connected with the zinc cup of an intermediate cell. Any desired method of connecting the cells and arranging the terminals may be employed.

After the cells have been introduced and properly connected in the manner shown in Fig. 3, the corrugated filler-boards C and C' are introduced above the cells. The assemblage is then slipped edgewise into the lower pasteboard cap D, after which the upper pasteboard cap D' is applied. The upper wall of the cap D' is provided with eyelets 10 to receive the terminals which project laterally from the top row of cells, assuming the cells to occupy the horizontal position shown in Fig. 2. Before the top cap D' is applied, it is preferred to apply a pasteboard strip 11 to cover the slots 6 and reinforce the slotted sidewall of the box 8. The strip 11 is provided with perforations 12 (one shown) for the terminals to pass through. The cap D' is secured to the battery assemblage by means of the terminal nuts 13. Wires may be clamped between the terminal nuts and the eyelets 10 which may be metallic eyelets.

The assemblage shown in Fig. 2, as has been indicated, is slipped edgewise into the outer container E. Before this is done, it is preferred to apply a coating 14 of paste, or other suitable adhesive, to the inner surface of the upper margin of the container E. When the assemblage shown in Fig. 2 is introduced, some of the paste adheres to the sides of the cap D and forms a bond between the lower cap and the adjacent walls of the container E. Also, the paste forms a bond between the upper cap D' and the adjacent walls of the outer container E. Thus, it will be understood that the outer pasteboard container is firmly bonded to the caps D and D', and particularly to the upper cap; and the inner battery assemblage is itself securely held together by reason of the construction described, the upper cap being additionally held in position by the nuts on the terminals.

In practice, dry-cells can be constructed so that there is little or no danger of oozing. Should some oozing occur, however, the stiff exuding paste, or electrolyte, will be confined within the individual cartons, which, it is noted, are closed at their open ends by the boards C and C'.

It will be understood that the improved battery is of amply strong construction, and is very much lighter than any other batteries of the same general type employing a common seal of plastic material within the inner cell-container and a closing seal of pitch, or the like, to close the outer container after the inner assemblage has been introduced therein.

The improved method and construction are well adapted to the upright type of battery which is now being extensively employed for radio purposes because of the convenience with which the upright type of battery can be introduced within the limited spaces available in many cabinets. In the illustration given, the battery comprises thirty cells, but it will be understood that the number of cells may be varied.

As will be appreciated by those familiar with the manufacture of batteries in large quantities, the invention enables a large saving in weight to be effected. This greatly reduces the tonnage, and effects large savings in the purchase of pitch and rosin compounds for sealing purposes and also very materially reduces freight costs.

The foregoing detailed description has been given for clearness of understanding only, and no unnecessary limitations should be understood therefrom, but the appended claims should be construed as broadly as permissible, in view of the prior art.

What I regard as new, and desire to secure by Letters Patent, is:

1. A dry-battery comprising an inner pasteboard box open at one side, dry-cells assembled therein with their carbon poles presented at the open side, a filler-board within the open side of said box, an outer casing having an open upper end through which the inner assemblage is introduced in such manner that the cells will be disposed horizontally, a closure for the outer container, and terminals projecting laterally from cells in the upper row through perforations with which said closure is provided.

2. A dry-battery comprising an inner pasteboard box having one side open, dry-cells arranged horizontally within said box with their carbon poles presented to the open side, a filler-board within the open side of said box, terminals projecting laterally upwardly from some of the cells of the top row, a pasteboard cap having depending flanges embracing said inner box and filler-board and having perforations in its top wall through which said terminals extend, and an outer casing receiving the assemblage mentioned, the top wall of said pasteboard cap constituting a closure for the casing.

3. A dry-battery comprising an inner pasteboard box having one side open, dry-cells arranged horizontally within said box with their carbon poles presented to the open side, a filler-board within the open side of said box, terminals projecting laterally upwardly from some of the cells of the top row, a pasteboard cap having depending flanges embracing said inner box and filler-board and having perforations in its top wall through which said terminals extend, an outer casing receiving the assemblage mentioned, the top wall of said pasteboard cap constituting a closure for the casing, and an adhesive securing the upper margin of said outer casing to the depending flanges of said cap.

4. A dry-battery comprising an inner pasteboard box having one vertical side open, rows of horizontal dry-cells within said box and having their carbon poles presented at the open side of said box, terminals projecting upwardly from some of the cells of the top row, upper and lower pasteboard caps embracing said inner box and filler-board, the upper cap having its top wall provided with perforations through which said terminals extend, an outer pasteboard casing having an open upper end receiving the assembly, and means securing the walls of the assembly to the walls of said casing.

5. In a dry-battery, an assembly comprising an inner pasteboard box having one vertical side open, dry-cells in said box having horizontal axes, terminals projecting upwardly from some of the cells of the upper row through the upper sidewall of said box, a filler-board in the open side of said box, and pasteboard caps embracing the upper and lower portions of said box and filler-board.

6. A dry-battery comprising an inner pasteboard box having an open vertical side, horizontal dry-cells within said box having their carbon poles presented at the open side, a filler-board in the open side of said box, threaded terminals extending upwardly from some of the cells of the upper row, an upper cap having depending flanges embracing the sides of the assembly mentioned and provided with perforations through which said terminals extend, and nuts on said terminals.

7. A dry-battery comprising an inner pasteboard box having an open vertical side, horizontal dry-cells within said box having their carbon poles presented at the open side, a filler-board in the open side of said box, threaded terminals extending upwardly from some of the cells of the upper row, an upper cap having depending flanges embracing the sides of the assembly mentioned and provided with perforations through which said terminals extend, nuts on said terminals, and an outer pasteboard casing having an open upper end and telescopically receiving said assembly, and an adhesive interposed between the walls of said casing and said cap.

8. A dry-battery comprising an inner pasteboard box having an open vertical side, horizontal dry-cells within said box having their carbon poles presented at the open side, threaded terminals extending upwardly from some of the cells of the top row, upper and lower caps embracing said assembly, the upper cap having perforations in its top wall through which said terminals extend, and nuts on said terminals above the top wall of said cap.

9. The method of assembling a dry-battery which comprises: introducing a series of dry-cells within an inner pasteboard box having an open side, while the box is resting on the opposite closed side, introducing a filler-board within the open side of said box, applying a pasteboard cap to embrace the filler-board and a portion of the box, and introducing the assembly edgewise into an outer pasteboard box serving as an outer container.

10. The method of assembling a dry-battery which comprises: introducing a series of dry-cells within an inner pasteboard box having an open side, while the box is resting on the opposite closed side, introducing a filler-board within the open side of said box, applying a pasteboard cap to embrace the filler-board and a portion of the box, introducing the assembly edgewise into an outer pasteboard box serving as an outer container, and applying an adhesive before the introducing of the assembly so that the adhesive will serve as a bond between the outer casing and the assembly.

EDWIN E. MEISEKOTHEN.